United States Patent
Squadron et al.

[11] Patent Number: 6,167,356
[45] Date of Patent: Dec. 26, 2000

[54] SYSTEM FOR MEASURING A JUMP

[75] Inventors: William F. Squadron, Scarsdale, N.Y.; Richard H. Cavallaro, Mountain View, Calif.; Stanley K. Honey, Palo Alto, Calif.; Nicholas R. Kalayjian, San Francisco, Calif.; Terence J. O'Brien, San Jose, Calif.; Marvin S. White, San Carlos, Calif.

[73] Assignee: Sportvision, Inc., New York, N.Y.

[21] Appl. No.: 09/344,290

[22] Filed: Jun. 30, 1999

Related U.S. Application Data

[60] Provisional application No. 60/091,446, Jul. 1, 1998.

[51] Int. Cl.$^7$ .................................................. G01C 5/00
[52] U.S. Cl. ..................... 702/166; 702/141; 73/379.01
[58] Field of Search .................................... 702/141, 166; 73/172, 379.01, 379.04, 379.05, 379.08

[56] References Cited

U.S. PATENT DOCUMENTS

| | | | |
|---|---|---|---|
| 4,839,824 | 6/1989 | Ando | 364/516 |
| 5,343,445 | 8/1994 | Cherdak | 368/10 |
| 5,349,569 | 9/1994 | Tanaka | 368/10 |
| 5,452,269 | 9/1995 | Cherdak | 368/10 |
| 5,636,146 | 6/1997 | Flentov et al. | 364/569 |
| 5,720,200 | 2/1998 | Anderson et al. | 73/172 |
| 5,724,265 | 3/1998 | Hutchings | 364/565 |
| 5,838,638 | 11/1998 | Tipton et al. | 368/10 |
| 5,897,457 | 4/1999 | Mackovjak | 482/8 |
| 5,899,963 | 5/1999 | Hutchings | 702/145 |
| 5,912,700 | 6/1999 | Honey et al. | 348/157 |
| 5,960,380 | 9/1999 | Flentov et al. | 702/178 |
| 6,018,705 | 1/2000 | Gaudet et al. | 702/176 |
| 6,052,654 | 4/2000 | Gaudet et al. | 702/160 |

FOREIGN PATENT DOCUMENTS

WO 99/35503  7/1999  WIPO.

OTHER PUBLICATIONS

*New Jump Measurement Revised Program,* source code, Jul. 11, 1995—see attached Remarks.
*Digital Ski Jump,* www.nextstep.com, 1995.

*Primary Examiner*—Patrick Assouad
*Attorney, Agent, or Firm*—Fliesler, Dubb, Meyer & Lovejoy LLP

[57] ABSTRACT

A system is disclosed that can measure the vertical height and/or the hang time of a jump. The system includes an acceleration detector, a controller, a display, a power source and a case that houses the components in a manner that allows the device to be worn or held by a person or object. The acceleration detector is used to determine the start of a jump and the end of a jump. Based on the time elapsed between the start of the jump and the end of the jump, the controller can determine the vertical height of the jump and/or the hang time.

39 Claims, 6 Drawing Sheets

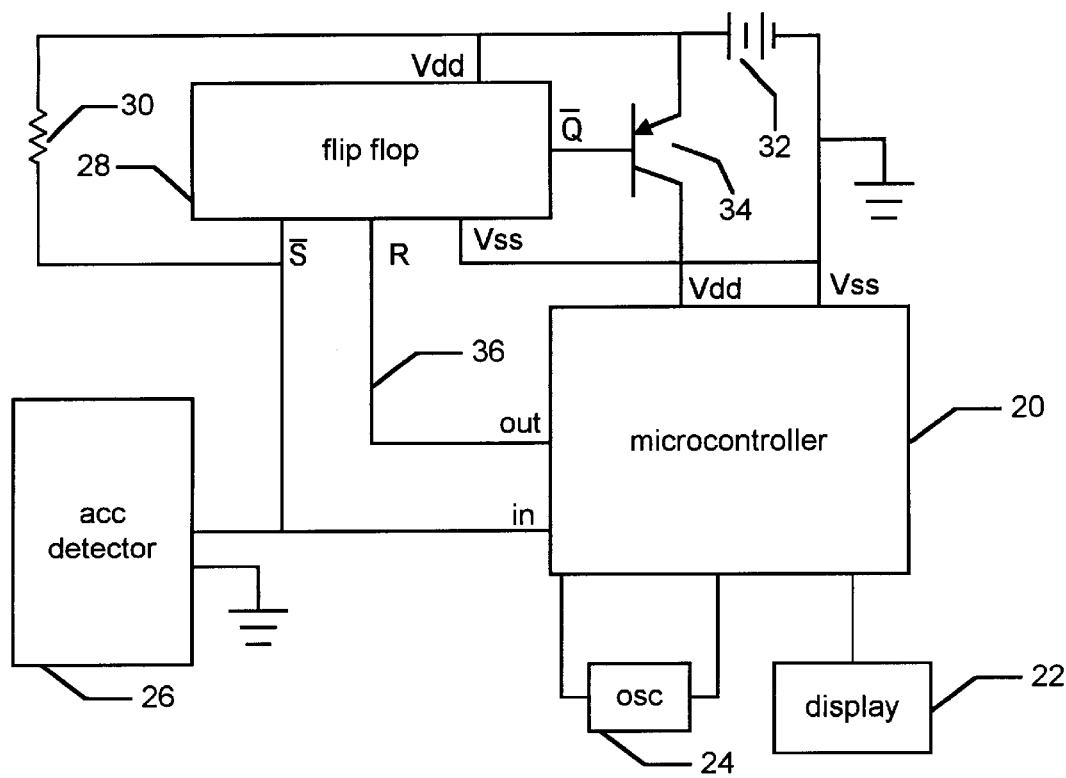
Fig. 1
Fig. 2
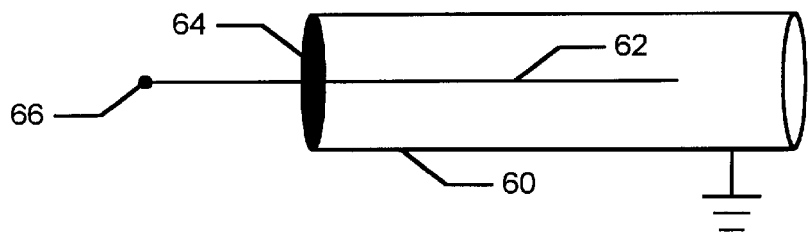

SYSTEM FOR MEASURING A JUMP

CROSS-REFERENCE TO RELATED APPLICATION

This Application claims the benefit of U.S. Provisional Application No. 60/091,446, filed on Jul. 1, 1998. That Provisional Application is incorporated herein by reference.

BACKGROUND OF THE INVENTION

1. Field of the Invention

The present invention is directed to a system for measuring statistics about a jump.

2. Description of the Related Art

The remarkable, often astonishing, physical skills and feats of great athletes draw millions of people every day to follow sports that range from the power of football to the grace of figure skating, from the speed of ice hockey to the precision of golf Sports fans are captivated by the abilities of basketball players to soar to the rafters, of a baseball pitcher to overwhelm the best hitters in the world, of a runner to explode down the track, etc. Many of these skills are part of the competition between athletes of all ages, playing on fields and in school yards throughout the nation.

One piece of information that has not been conveniently and accurately available to fans and players of sports like basketball, track and field, volleyball, etc. is the vertical height that someone reaches when jumping. In the professional ranks, such information will not only create a statistic that reflects a critical athletic skill —jumping ability—but will also provide fans and players with information that will enhance their analysis of the game. For example, subtle variations in different basketball players' jumping ability, now verifiable, may explain rebounding strength or defensive domination. In the non-professional ranks, it will allow recreational players to compare their skills to friends and professionals.

Fans of other sports, like high jumping, volleyball, figure skating, and many more, will benefit from the information about jumping ability. It will quickly join other popular statistics like running speed and throwing distance in adding to viewers' and players' appreciation of an athletic event.

Past attempts to measure the vertical height of a jump have not been adopted on a wide scale because the devices were cumbersome to use, store and/or transport. For example, one method for measuring jumping ability included an athlete jumping next to a wall and touching the highest possible part of the wall. The jump can then be measured using a tape measure or other measuring device based on a marking on the wall. Obviously, this solution is not mobile and cannot be used during a game.

Another solution included using a portable mat connected to a microprocessor. Imbedded within the mat are a plurality of pressure sensitive switches which are wired together in parallel. The switches are normally open and may be closed in response to pressure from the feet of a jumper. While the mat is mobile, it is large and difficult for the average person to transport and store. For example, it would be difficult for children to transport the mat to and from a playground, etc. Additionally, the mat requires user input (e.g. stepping on the switches) to signal the beginning and end of a jump. Additionally, the device cannot be used during a game because the mat would interfere with the game. Relying on user input makes the mat more cumbersome to use and less reliable.

Another system uses one or more video cameras with a computer to determine the height of a jump during a live basketball game. While this system is very accurate, it is not suitable for mass consumer distribution due to its size, cost and complexity.

Therefore, a system is needed that can conveniently determine the vertical height of a jump.

SUMMARY OF THE INVENTION

The present invention is directed to a system for measuring the vertical height of a jump. The vertical height of a jump is defined as the estimated maximum vertical height achieved during the jump. For purposes of this discussion, a jump is the act of springing off (and returning to) the ground or other base using a muscular effort. Thus, the word jump can be used to describe a person pushing off the ground with their legs (or arms) or an object being propelled off the ground by a muscular effort. The present invention can be used in conjunction with many different events and situations, including various sporting events and events other than sporting events. Additionally, the present invention can be used to determine hang time in addition to the vertical height of a jump. Hang time is defined as the time that a person or object is in the air during a jump.

In one embodiment, the invention is a mobile, pager-sized device that detects the start of a jump, detects the end of the jump, determines the time elapsed between the start and the end of the jump, and uses the elapsed time to determine the vertical height of the jump. Both the elapsed time and the height of the jump can be displayed to the user of the device. The start of a jump is the moment that a person or object lifts off the ground (or other surface). The end of a jump is the moment that a person or object touches back down on the ground (or other surface). In one alternative, the present invention does not require a user to indicate that a jump is occurring, a jump has started or a jump has ended.

In one embodiment, the present invention includes a power source, a display for indicating the time and/or height of the jump, jump detection circuitry for detecting the occurrence, start and/or end of a jump, and a means for calculating the vertical height of the jump. One example of jump detection circuitry is an acceleration detector. In one embodiment, the means for calculating the vertical height of a jump is a controller. The controller could also be used to determine the hang time of the jump. In one alternative, the controller is a special purpose controller used for the functions of the present invention. In another alternative, the controller can be a general purpose controller which includes memory for storing program code to program the controller to perform the functions of the present invention.

In one embodiment, the device is wearable by a user. That is, if the user is a human, the device can be held by the human, put in the human's pocket, attached to a belt, or attached to other article of clothing. If the device is to be used to measure the vertical height achieved by an object, the device can be easily attached to the object. One solution for making the device wearable is to have it pager-sized (or some other suitable size) with a belt clip or other suitable attaching apparatus. Another solution includes placing the device inside a shoe.

In order to save power, one alternative includes having the device shut down after a predefined period of inactivity and waking up at the start of a jump. In another embodiment, the device can wake up at the push of a button or other input.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 1 is a block diagram of one embodiment of the present invention.

FIG. 2 depicts a first embodiment acceleration detector.

DETAILED DESCRIPTION

Figure 3:
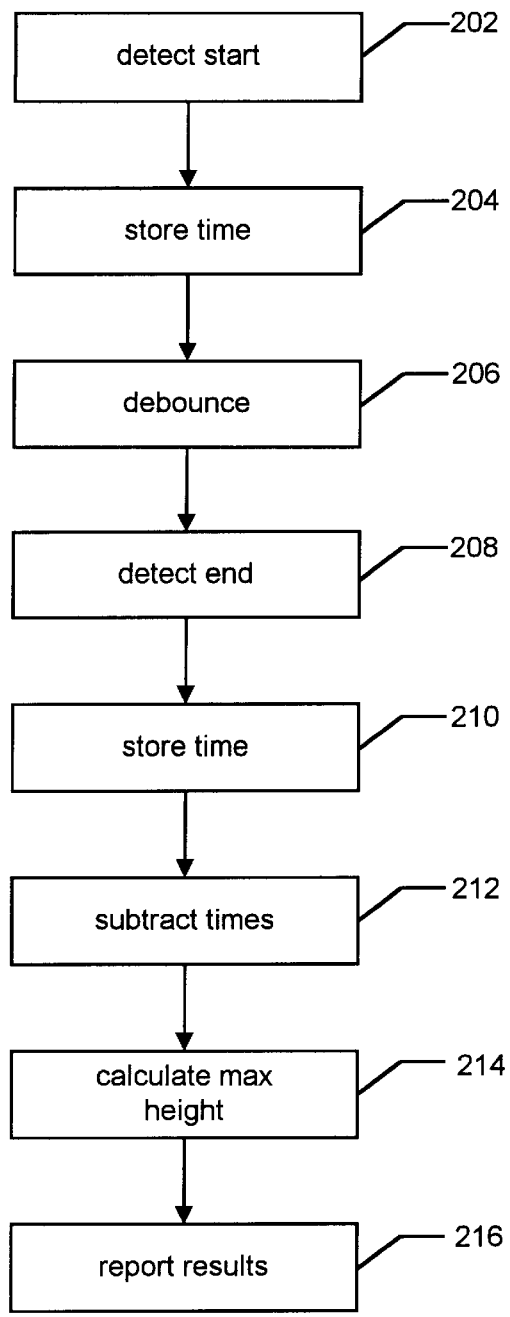
FIG. 3 is a flow chart describing one exemplar method of operation of the embodiment depicted in FIG. 1.

FIG. 1 shows an exemplar embodiment of the present invention. The device of FIG. 1 is designed to be packaged in a small plastic or metal case approximately the size of a pager or a bar of soap. It is anticipated that the device can be worn on a person's belt, held in the hand, stored in a pocket, attached to an object, etc. Thus, a device incorporating the technology of the present invention is mobile in the sense that it can be easily transported and stored for commercial and personal use.

FIG. 1 shows a controller 20 which can be a Motorola 6301 microcontroller or other appropriate microcontroller known in the art. The disclosed microcontroller 20 can also be replaced by other suitable controllers; for example, rather than using a microcontroller with software, a custom integrated circuit can be used. Other suitable controllers include a microprocessor or discrete components to perform the functions described below.

Microcontroller 20 is connected to display 22. In one embodiment, display 22 is an LCD; however, other suitable displays can be substituted. Display 22 can be used to report the height of a jump and/or the hang time for the jump. In one embodiment, display 22 automatically switches between displaying the hang time and the height. The hang time and height can be displayed using text or graphics. Also connected to microcontroller 20 is an oscillator 24.

Acceleration detector 26 is connected to microcontroller 20, the $\overline{S}$ input of flip flop 28 and the bottom of resistor 30. Acceleration detector 26 is used to detect a vertical acceleration of the device depicted in FIG. 1. When there is a vertical acceleration, acceleration detector 26 sends a signal indicating such to microcontroller 20. Similarly, when there is a negative acceleration, acceleration detector 26 can send a similar signal to microcontroller 20. In one embodiment, acceleration detector 26 sends a signal by grounding its output contact in response to a vertical acceleration.

When a person is in the process of jumping, the person is experiencing a take-off acceleration. At the point when the person is at the top of the jump, the person appears to be weightless. When the person touches back on the ground, the person experiences a landing acceleration. Knowing when a person experiences a take-off acceleration and a landing acceleration can be used to determine the start and end of a jump.

FIG. 2 is one example of an acceleration detector. The acceleration detector includes a brass or copper tube 60 and a wire 62 suspended in tube 60. Wire 62 is attached to cap 64 with an epoxy or other insulating material. Cap 64 and the insulating material act to suspend wire 62 inside tube 60 in a cantilevered fashion. Tube 60 is connected to ground. The end of wire 62 (noted in FIG. 2 by reference numeral 66) is connected to microcontroller 20, the $\overline{S}$ input of flip flop 28 and the bottom of resistor 30.

Battery 32 is used to supply power to the circuit of FIG. 1. In one embodiment, battery 32 is a 9 volt battery. In another embodiment, battery 32 can be a lithium battery, a camera battery, a watch battery or any other suitable battery known in the art that is small enough to fit inside the device of FIG. 1 and capable of a sufficient amount of power.

Flip flop 28, resistor 30 and PNP transistor 34 are used to turn on (or wake up) the device of FIG. 1. That is, in the embodiment depicted in FIG. 1, there is no on/off switch. The device turns on or wakes up the first time the system detects a take-off acceleration (or start of a jump). Resistor 30 is connected between the $\overline{S}$ input of flip flop 28 and a terminal of battery 32, causing the $\overline{S}$ input to normally be pulled up. An acceleration is detected when wire 62 bends and becomes in contact with tube 60, causing terminal 66 and the $\overline{S}$ input of flip flop 28 to be grounded. When the $\overline{S}$ input of flip flop 28 is connected to ground, the $\overline{Q}$ output of flip flop 28 is set to logic level zero. The base of transistor 34 is connected to the $\overline{Q}$ output of flip flop 28. The emitter of transistor 34 is connected to battery 32. The collector of transistor 34 is connected to microcontroller 20. When the $\overline{Q}$ output of flip flop 28 is at logic level zero, transistor 34 turns on and power flows from battery 32 to microcontroller 20. When the $\overline{Q}$ output of flip flop 28 is at logic level one, microcontroller 20 is cut off from power.

Microcontroller 20 is programmed so that after it receives an indication of a landing acceleration from acceleration detector 26, it begins a countdown. In one embodiment, microcontroller 20 counts down from 10 minutes. If during the countdown, another take-off acceleration and landing acceleration is detected, the countdown is reset and starts over again. When the countdown reaches zero (e.g. 10 minutes have elapsed), microcontroller 20 sends a signal on line 36 to the R input of flip flop 28 causing flip flop 28 to reset, the $\overline{Q}$ output of flip flop 28 to be reset to logic level one and power to be cut off from microcontroller 20. The interval for shutting off microcontroller 20 can be set to other preset time intervals other than 10 minutes. Thus, the device of FIG. 1 is said to shut down after a preset amount of time without activity.

FIG. 3 is a flow chart describing the method of operation of the embodiment depicted in FIG. 1. In step 202, the system detects the start of a jump. If the system was not in operation mode, step 202 will include powering on (or waking up) the system as described above. Detecting the start of the jump is done (in the embodiment of FIG. 2) by detecting the end of the first take-off acceleration. The first opening of the circuit of FIG. 2 after the first closing of the circuit of FIG. 2 is detected to be the start of the jump. For example, when a person is bending to begin a leap, an acceleration will be detected and wire 62 will bend and come in contact with tube 60 causing accelerator detector 26 to send a logic level zero to microcontroller 20. When the person leaves the ground, the jump starts and wire 62 will straighten out and release from contact with tube 60. At the point when wire 62 straightens out and the circuit opens, the acceleration detector's output will be pulled up to logic level one causing the microcontroller to detect the start of the jump.

In step 204, the time of the start of the jump is stored in a memory inside microcontroller 20. The memory could include RAM, a register, etc. In step 206, the system performs a debouncing operation on the data received from acceleration detector 26. That is, after the jump begins and wire 62 releases from contact from tube 60, wire 62 is likely to oscillate for a short period of time. During this oscillation, wire 62 may come in contact with tube 60, thereby, providing false readings. Thus, using standard technology known in the art, either in software or hardware, the system can be designed to ignore indications of an acceleration during a short time period following the beginning of the jump.

In step 208, the system detects the end of the jump. For example, when a person touches down on the ground during the jump, acceleration detector 26 will detect a landing acceleration causing wire 62 to bend and come in contact with tube 60. Thus, the first closing of the circuit shown in FIG. 2 after the start of the jump (and after debouncing) is detected to be the end of the jump. After the end of the jump is detected, it is likely that wire 62 will oscillate slightly. However, because the end of the jump is already detected, there is no need to debounce. In step 210, the system stores the time of the end of the jump. In one embodiment, microcontroller 20 has an internal clock and steps 204 and 210 store the time of the internal clock at the appropriate instances. In another embodiment, microcontroller 20 will have a counter and, therefore, step 206 will be used to start the counter (and possibly store time=0) and step 210 is used to store the time of the counter when the jump is completed. In step 212, microcontroller 20 subtracts the time of the end of the jump (from step 210) from the time of the beginning of the jump (from step 204). That difference is the hang time (or elapsed time) of the jump.

In step 214, microcontroller 20 calculates the vertical height of the jump. In one embodiment, the vertical height h is determined as follows:

$$h=(\tfrac{1}{8})(g)(t)^2$$

$$g=\text{ft/sec}^2$$

The variable t is equal to the elapsed time of the jump determined in step 212.

To obtain a more accurate estimate of the time the object is in the air, i.e., the time between lifting off the ground until touching the ground again, adjustments to the time of the initial lift off acceleration and the final touch down deceleration may be used. A detector worn on the jumper's waist may begin acceleration slightly before the jumper's foot does. Similarly, the foot may touch the ground on landing slightly before the acceleration detector on the waist senses an acceleration. So small adjustments in the measured value of t may be used to improve the accuracy of the hang time measurement and the computed value of h.

In step 216 of FIG. 3, the system reports the result. The step of reporting the result can include displaying the height determined in step 214 or the elapsed time determined in step 212. In one embodiment, display 22 alternates between displaying the height and displaying the elapsed time. In alternative embodiments, reporting results could include sending the height or elapsed time to a printer, to a web page on the Internet, to an application on an Intranet, to another software process, to a television broadcaster, etc. The elapsed time and vertical height can be transmitted from the device of FIG. 1 to another device via an infra red link, RF link, a serial connection, etc.

In an alternative embodiment, the tube and wire of FIG. 2 can be replaced by an accelerometer. In another embodiment, the accelerometer can be used to measure the degree of acceleration. Microcontroller 20 can use the degree of acceleration to more accurately calculate the height achieved during a vertical leap. Height can be determined by integrating twice. In another embodiment, the system can use an ultrasound transceiver, a radar transceiver or a radio transceiver to detect the height of a device. The user can attach the device, press a button to determine a reference height and then start the jump. Throughout the jump, the system can constantly measure height and when the jump is completed the maximum height measured would be the vertical height of the jump. Alternatively, a transceiver can be used with the circuit of FIG. 1 so that acceleration detector 26 is used to signal to microcontroller 20 to measure the height at the beginning of the jump and have microcontroller 20 continue to measure height throughout the jump until acceleration detector 26 indicates the end of the jump. In yet another embodiment, a Doppler radar can be used to measure the vertical velocity as a function of time, and then integration can be performed to calculate height.

In one alternative embodiment, the display includes a number of LED's to indicate jump height. In another embodiment, the device will not include a display, rather a speaker can be used to output tones or to report the height using synthesized or pre-recorded speech. Another embodiment without a display uses IR, RF, RS 232 or serial links to report the height.

Figure 4:
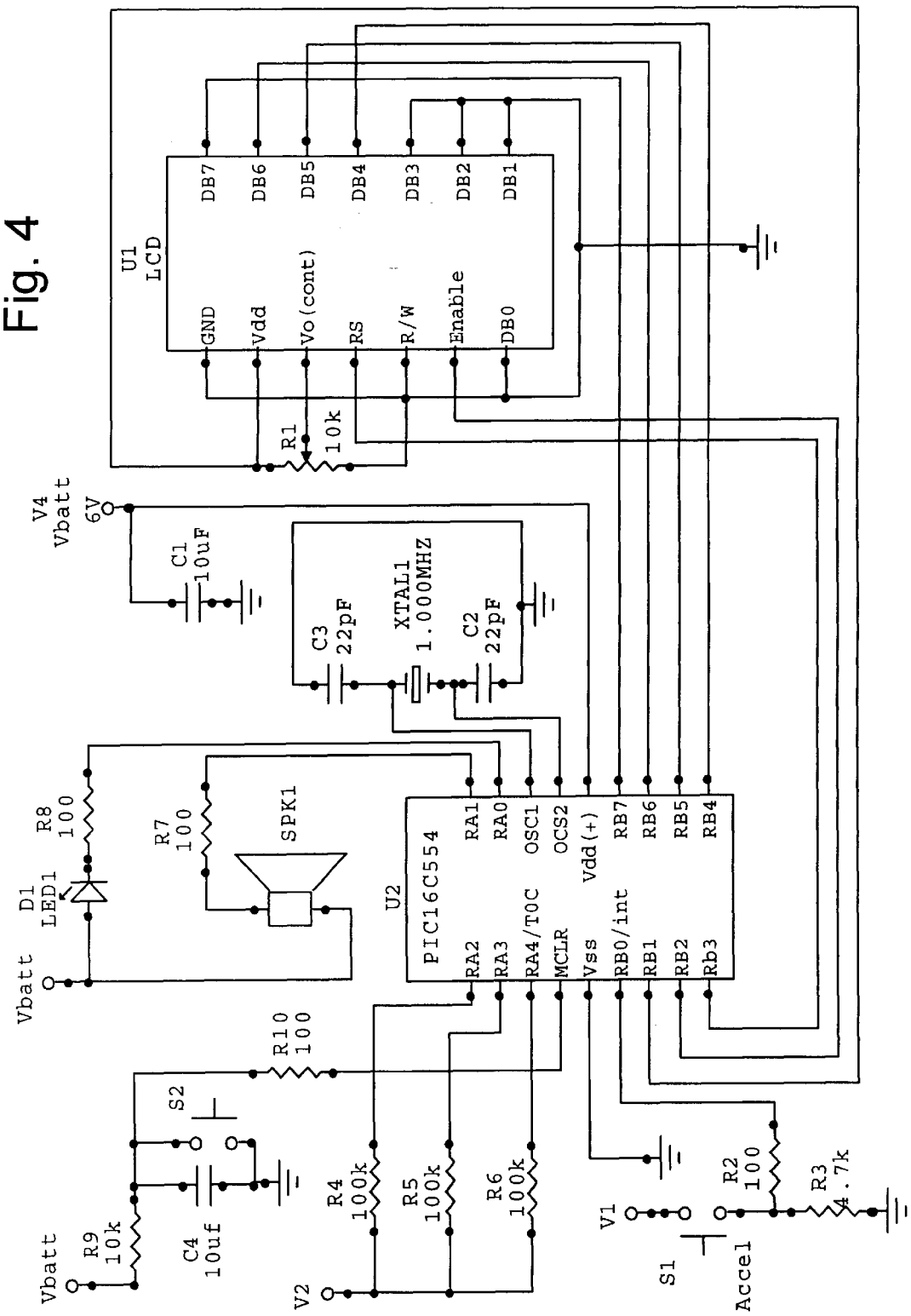
FIG. 4 is a schematic diagram of a second embodiment of the present invention.

FIG. 4 shows a schematic diagram of a second embodiment of the present invention. The device includes an LCD marked with reference U1 and a controller marked with reference U2. One example of a suitable controller is the PIC16C554-04 8 bit microcontroller manufactured by Microchip Technology, Inc., which includes 512K of program memory (one time programmable). LCD U1 is an 8 character by 2 line LCD from Optrex. In another embodiment, microcontroller U2 will be replaced by a custom integrated circuit and LCD U1 will be replaced by a custom LCD. The embodiment of FIG. 4 also includes an acceleration detector Accel a speaker SPK 1 and a light LED 1. The light LED 1 is shown connected to Vbatt and 100 ohm resistor R8. Vbatt is a connection to the battery. In this embodiment, the battery includes two three volt lithium cells. Resistor R8 is also connected to the RA0 input of microcontroller U2. Speaker SPK1 is connected to Vbatt and 100 ohm resistor R7. The other side of resistor R7 is connected to the RA1 input of microcontroller U2. The OSC1 pin and OSC2 pin of microcontroller U2 are connected to resonator XTAL1. The OSC2 pin is also connected to 22 pF capacitor C2. Capacitor C1, 10 uF, is connected to capacitor C2 and ground. Capacitor C3, a 22 pF capacitor, is connected to ground and resonator XTAL1. The VDD pin of microcontroller U2 and capacitor C1 are connected to Vbatt. The RB4, RB5, RB6 and RB7 pins of microcontroller U2 are connected respectively to pins DB4, DB5, DB6 and DB7 of LCD U1. The RB 1 pin of microcontroller U2 is connected to the VDD pin of LCD U1 and variable resistor R1. The GND pin of LCD U1 is connected to resistor R1 and ground. The V0 (contrast) pin of LCD U1 is also connected to variable resistor R1. The RB2 pin of microcontroller U2 is connected to the Enable pin of LCD U1. The RB3 pin of microcontroller U2 is connected to the RS pin of LCD U1. The read/write pin, DB0 pin, DB1 pin, DB2 pin and DB3 pin of LCD U1 are all grounded. The RB0/int pin of microcontroller U2 is connected to 100 ohm resistor R2.

Acceleration detector Accel is connected to resistor R2 and the battery (the connection shown as V1). One side of 4.7K ohm resistor R3 is connected to ground and the other side is connected to resistor R2 and acceleration detector Accel. The VSS pin of microcontroller U2 is grounded. The MCLR pin of controller U2 is connected to one side of 100 ohm resistor R10, and the other side of resistor R10 is connected to 10K ohm resistor R9, 10 UF capacitor C4 and one side of switch S2. The other side of switch S2 and capacitor C4 are grounded. Switch S2 resets the device of FIG. 4. In one embodiment, switch S2 is an internal switch which can only be pushed if the case is opened up. In another embodiment, switch S2 is an external switch so the user can reset the system. In a third embodiment, switch S2 is a eliminated. Resistor R9 is also connected to Vbatt.

The RA2 pin of microcontroller U2 is connected to 100 K ohm resistor R4. The RA3 pin of microcontroller U2 is connected to the 100 K ohm resistor R5. RA4 pin of microcontroller U2 is connected to the 100 K ohm resistor R6. R4, R5 and R6 are also connected to the battery. Pins RA2, RA3 and RA4 are not used. Resistors R4, R5 and R6 are just used as pull up resistors for the unused pins.

The acceleration detector Accel can be any of various embodiments. One example of a suitable acceleration detector is shown in FIG. 2. A second example of an acceleration detector is a spring with an electricity conducting weight attached to the end of the spring. Next to the weight, but not touching the weight, is an electrical contact. When a device is accelerated, the spring bends, causing the weight to touch the electrical contact which then closes the circuit. In one embodiment, the weight can be a stainless steel ball.

Figure 5:
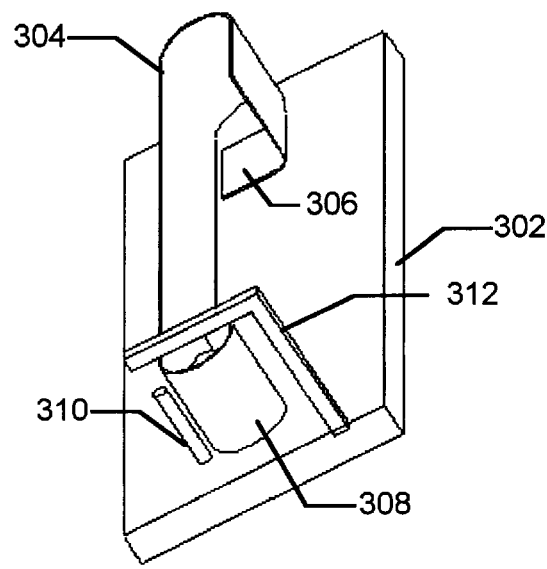
FIGS. 5 and 6 depict a second embodiment acceleration detector.
Figure 6:
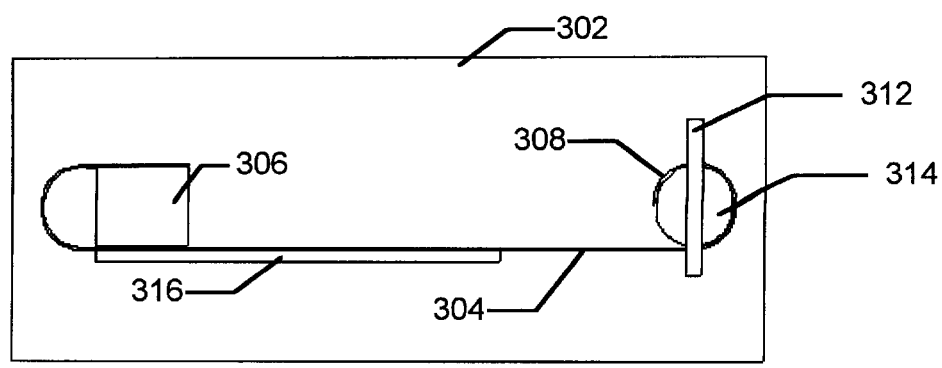

Another suitable acceleration detector is shown in FIGS. 5 and 6. The acceleration detector is mounted on circuit board 302. The device includes a brass member 304. One end 306 of the brass member 304 is mounted on circuit board 302. The other end 308 of brass member 304 is curled around and attached to a weight 314. In one embodiment, weight 314 is a solid ball. Post 310 is an electrical contact. L shaped bar 312 serves to prevent brass member 304 from bending too far. Attached to brass member 304 is a dampening material 316 which dampens the vibration of brass member 304. In one embodiment, the dampening material is a soft silicone type rubber. One suitable example of a dampening material is Sorbothane. When there is no acceleration, brass member 304 is in the position shown in FIG. 5 such that brass member 304 is not in contact with post 310. When an acceleration occurs, brass member 304 bends until it comes into contact with post 310. End 306 of brass member 304 is connected to an electrical contact on circuit board 302. Thus, when end 308 of brass member 304 comes in contact with post 310, the circuit is closed indicating the detection of an acceleration.

Figure 7:
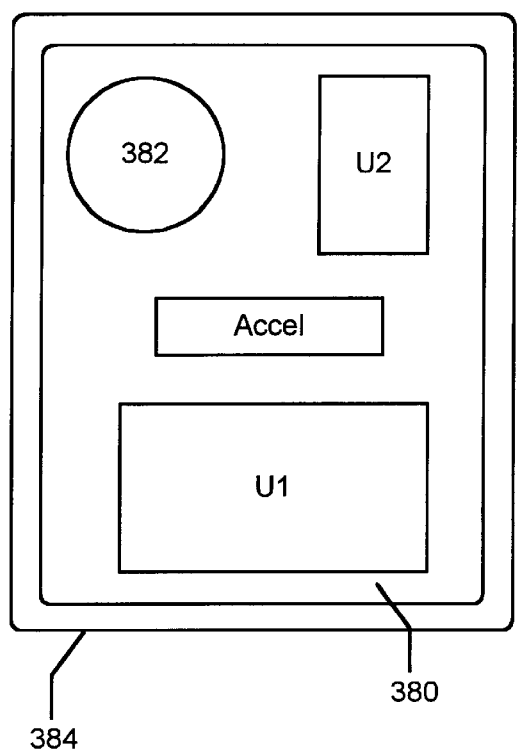
FIG. 7 is a layout diagram of the embodiment depicted in FIG. 4.

FIG. 7 is a layout drawing of the embodiment of FIG. 4 using the acceleration detector of FIG. 5. FIG. 7 shows acceleration detector Accel mounted on circuit board 380. Also mounted on circuit board 380 is battery 382, LCD U1 and microcontroller U2. FIG. 7 also shows a partial view of the hard plastic case 384, which houses the components of the device. In one embodiment, the case would be approximately the size of a pager or a bar of soap, with an opening so that the user can view the LCD. In one alternative, there would be an additional opening to allow access to the battery.

Figure 8A:
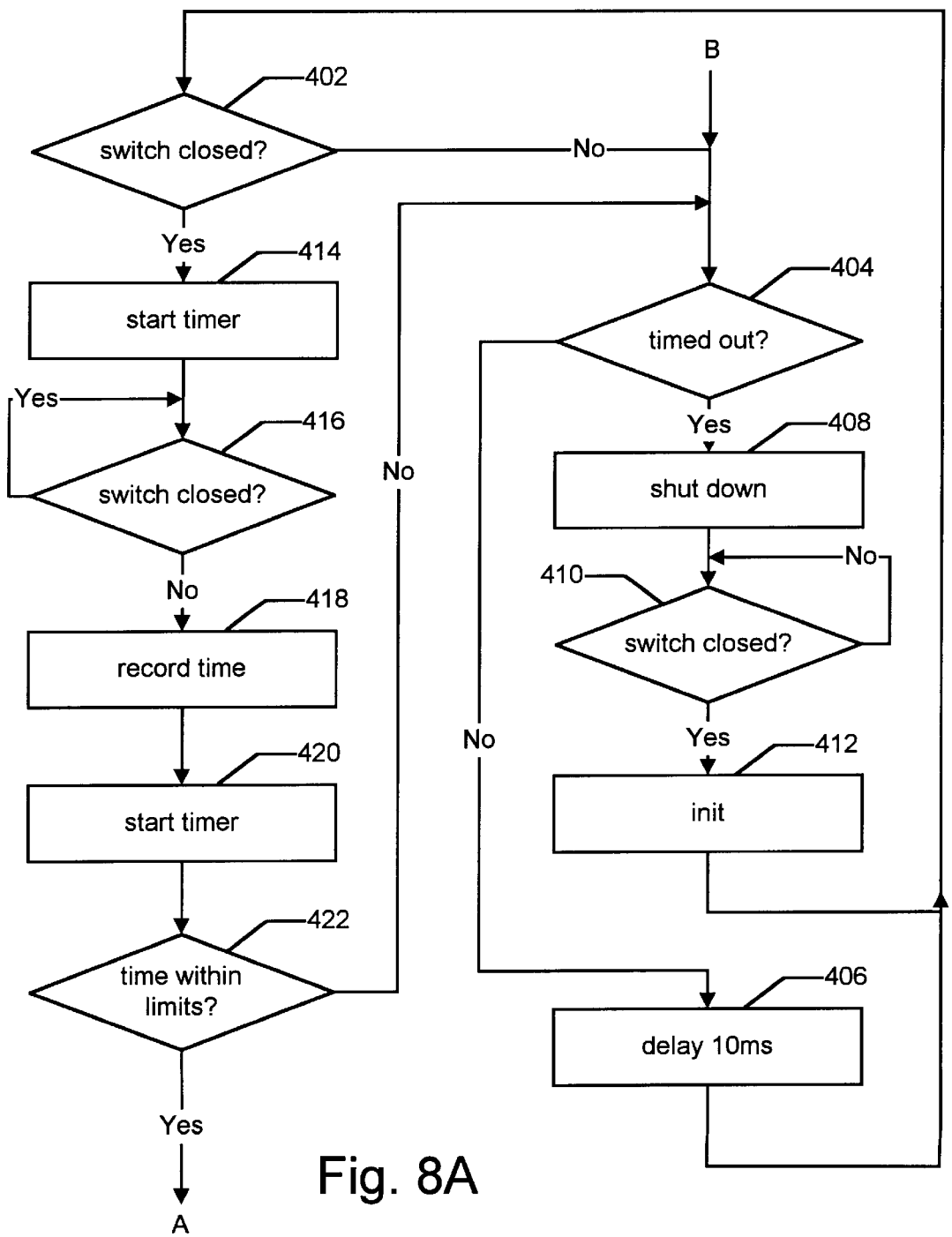
FIGS. 8A and 8B include a flow chart describing one exemplar method of operation of the embodiment depicted in FIG. 4.
Figure 8B:
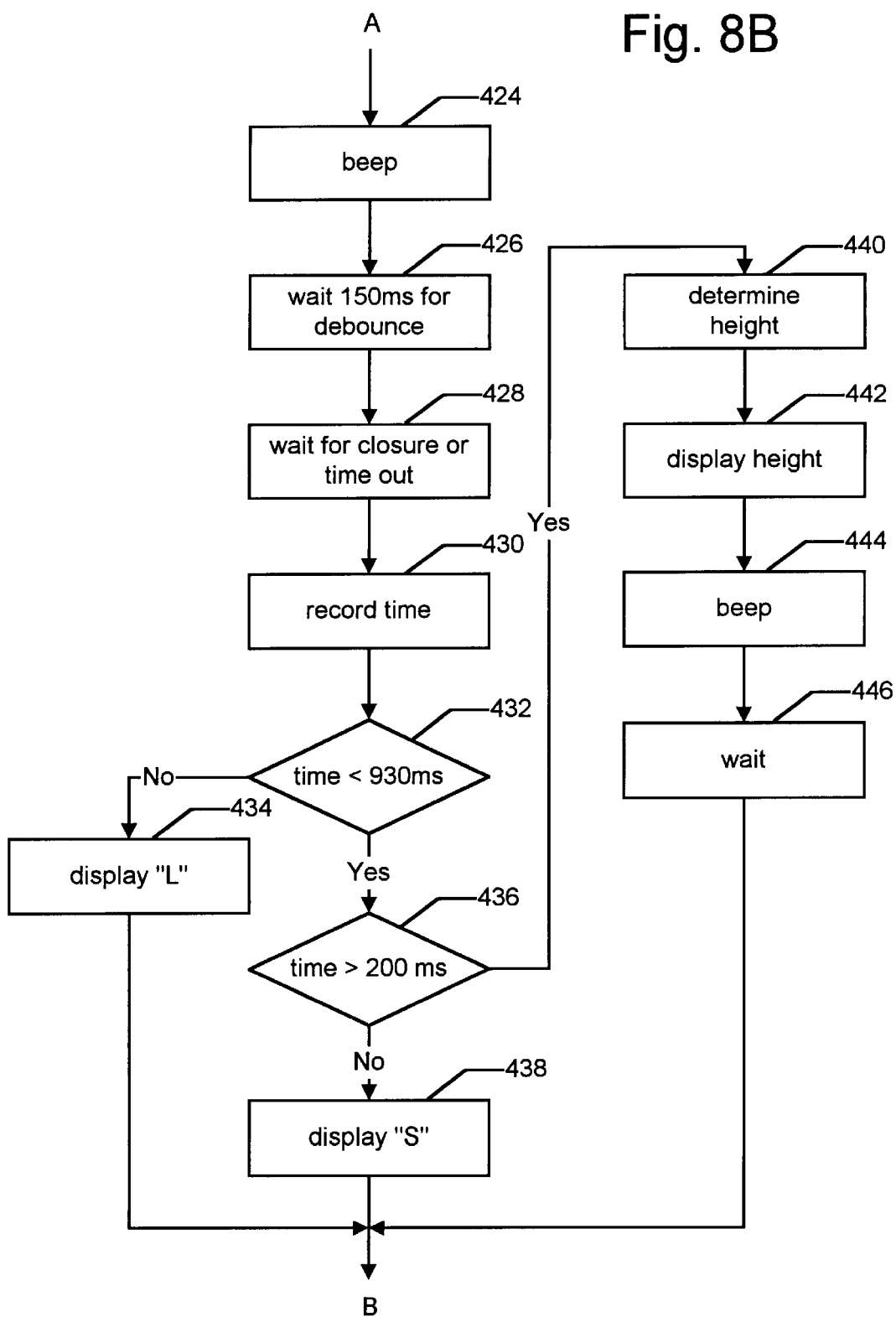

FIGS. 8A and 8B include a flow chart describing one exemplar method of operation of the embodiment depicted in FIG. 4. In step 402, the device determines whether the switch is closed. In one embodiment, the switch is the acceleration detector. In the example of the acceleration detector of FIG. 5, the switch is closed when brass member 304 is in contact with post 310. In the embodiment of FIG. 2, the switch is closed when wire 62 is in contact with tube 60. If the switch is not closed, then in step 404 the system determines whether it has timed out. In one example, the system has timed out if there has been 46 seconds without a jump. In other embodiments, various other predetermined periods can be used. If the system is not timed out, the system delays for 10 ms (step 406) and returns to step 402. If the system did time out, then the system shuts down in step 408. Shut down includes turning off the LCD. Shut down also puts the microcontroller into a sleep mode, which stops the oscillator from running and puts the microcontroller into a static state. The microcontroller has a function called "wakeup on change" which is active on the pin that the acceleration detector is connected to. When there is a change of voltage on the pin, the microcontroller starts the oscillator and jumps to running the program at the first block of program memory. Thus, while the system is in shut down mode, the system continually waits in step 410 until the switch is closed again. If the switch does close, then the system proceeds to initialization step 412. In one embodiment, initialization step 412 includes the microcontroller starting to run the software and initializing the LCD. After initialization step 412, the device loops back to step 402.

If in step 402 it is determined that the switch was closed, then the device starts a timer in step 414. In step 416, the device continuously monitors whether the switch is still closed. That is, step 416 is looking for the switch to open after the switch was closed in step 402. The detection of the switch opening in step 416 is the start of the jump. Thus, it is assumed that step 414 is performed sufficiently fast enough so that the switch does not open until after step 416 is performed. In step 418, the system records the time the switch was opened. In step 420, the system starts the timer again. If the system only includes one timer, then step 420 also includes resetting the timer that has been previously used in steps 414 and 418. In step 422, the system determines whether the time recorded in step 418 is within predefined limits. In one embodiment, there is a lower limit and an upper limit being tested. The lower limit tests whether the switch was closed long enough so that the data is a legitimate jump. It has been observed that the act of beginning a jump involves a sustained acceleration which causes a sustained closure of the switch. In one embodiment, the system will make sure that the switch was closed at least 20 ms. In another embodiment, the system will test to make sure that the switch was closed for at least 40 ms. It is assumed that a closure for less than 20 ms was not the beginning of a jump. Perhaps, it was noise, walking or some other false reading. Step 422 also tests for a maximum time limit. If the switch was closed for too long, then it is also assumed that the switch closure was not due to the start of a jump. In one embodiment, the system tests to make sure that the switch was closed for less than 256 ms. Thus, one embodiment in step 422 determines whether the time recorded in step 418 was greater than 20 ms and less than 256 ms. If the recorded time was not within the time limits in step 422, then the method loops to step 404. If the recorded time was within the time limits, then it is assumed that a jump has started and the method proceeds to step 424 of FIG. 8B.

In step 424, the device beeps or sounds a tone using speaker SPK1. The step is optional and can be eliminated. The purpose of this step is purely to alert the user that a start of a jump has been detected. In step 426, the system waits 150 ms to account for debouncing of the acceleration detector. In step 428, the system waits for the acceleration detector to detect that the switch was closed or a time out. An example of a predetermined time to determine whether the system is timed out in step 422 is whether 2.5 seconds have passed.

When the system detects a closure of the switch or a time out in step 428, the system records the time in step 430. In step 432, the system determines whether the time recorded in step 430 is less than 930 ms. If it is not less than 930 ms, then the system proceeds to step 434 and displays a "L" on the LCD to indicate that the time between the detected start of a jump and detected end of the jump was too long to be a valid jump. If the time recorded in step 430 was less than 930 ms, then the system proceeds to step 436 and determines whether the time recorded was greater than 200 ms. If the time was not greater than 200 ms, then the system proceeds to step 438 and displays a "S" on the LCD to indicate to the user that the time period between detected start of the jump and detected end of the jump was too small to be a legitimate jump. After steps 434 and 438, the system loops back to step 404 of FIG. 8.

If in step 436 it is determined that the time recorded in step 430 was greater than 200 ms, then the system assumes that the time recorded in step 430 is the hang time (or elapsed time) for a legitimate jump and the system proceeds to step 440 to determine the vertical height of the jump. One method for determining the vertical height of the jump based on the elapsed time is to use the mathematics described above. Another method for determining the height is to precompute the heights for different time periods and store the precomputed heights in a look-up table. Thus, the elapsed time can be used to access the look-up table of heights to determine the correct vertical height of the jump. One example of such a look up table is the array height [ ] found in the source code included in the Appendix. Each entry in the look up table represents a one inch increment in height. Thus, the first entry is for a one inch jump, the second entry is for a two inch jump, the third entry is for a three inch jump, etc. The value stored for each entry of the array is one fourth of the maximum time in milliseconds for that particular height. For example, if the hang time is less than 144 ms (36×4), then the jump was one inch high. If the hang time was less than 320 ms and greater than or equal to 288 ms, then the jump was five inches.

In step 442, microcontroller U2 causes LCD U1 to display the height calculated in step 440. In an alternative embodiment, step 442 could also include displaying the hang time. In yet another alternative, step 442 can include displaying hang time but not height. In step 444, controller U2 causes speaker SPK1 to beep indicating that a jump has ended and the height has been displayed. In step 446, the system waits a predetermined period of time. In one embodiment, the system waits one second. After waiting in step 446, the method loops back to step 404.

As can be seen, the system can operate in a fully automatic mode. The system automatically detects the start of a jump, automatically detects the end of a jump and automatically displays the determined height or hang time on the LCD. The user need not push any buttons, step on any switches or provide any indications to the device that a jump is occurring, starting or ending.

The Appendix below provides one example of source code suitable to program controller U2 to perform the method of FIGS. 8A and 8B. This code is stored in the program memory of controller U2.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

APPENDIX

```
                  Copyright 1999 Sportvision Systems LLC
#define        PROJECTNAME           "JUMPBOX"
                                 // IMT VALUES
#define        FILENAME             "JUMP0005"
                                 // FOR LCD SPLASH
///////////// INCLUDED FILES //////////////////////////
#include <pic.h>;
#include "remtime.h";
///////////// Config bit defines //////////////////
_CONFIG(FOSC0|CP0|CP1);
///////////// PRE COMPILER DEFINES //////////////////////
#define        TRISAVALUE           0B11101
#define        TRISBVALUE           0B00000001
#define        TAKEOFFTIME          20
/////////////HARDWARE BIT DECLARATIONS //////////////////////
static bit LED1   @(unsigned)&PORTA*8; // PORTA 0
static bit LED2   @(unsigned)&PORTA*8+1; // PORTA 1
static bit RS     @(unsigned)&PORTB*8+3; // PORTB 3
static bit ENABLE @(unsigned)&PORTB*8+2; // PORTB 2
static bit LCDPWR @(unsigned)&PORTB*8+1; // PORTB 1
static bit ACCEL2 @(unsigned)&PORTA*8+4; // PORTA 4
static bit ACCBL1 @(unsigned)&PORTB*8; // PORTB 0
/////////////VARIABLB DECLARATIONS //////////////////////
const unsigned char inits[12]= {3, 3, 3, 2, 2, 8, 0, 8, 0, 1, 0, 0x0c};
const unsigned char heights[]= {36, 51, 62, 72, 80, 88, 95, 102, 108, 114,
                    119, 125, 130, 135, 139, 144, 148, 153,
                    157, 161, 165, 169, 173, 176, 180, 184,
                    187, 190, 194, 197, 200, 204, 207, 210,
                    213, 216, 219, 222, 225, 228};
//const char splash1[8] = PROJECTNAME;
//const char splash2[8] = FILENAME;
static unsigned char BIGTIME;
static unsigned char BEEPTIME;
unsigned char time;
unsigned char TIMER0TEMP;
unsigned char SHUTDOWNTIMER;
unsigned int aTimer;
unsigned char INCHES;
/////////////FUNCTION PROTOS //////////////////////
void SETUPS (void);
void PLLSE_ENABLE (void);
void SEND_COMMAND (unsigned char command);
void SEND_DATA (unsigned char data);
void INIT_DISPLAY (void),
void CLEAR_LCD (void);
void SHUTDOWN (void);
void DISPLAY_CLOCK (void);
void GOTO_ADDRESS (unsigned char address);
void BEEP (void);
void BEEP2 (void);
void GET_HEIGHT (void);
///////////// FUNCTIONS //////////////////////
void main (void){
  SETUPS();
  LED1 = 0;
  delay_ms(100);
  LED1 = 1;
  INIT_DISPLAY();
  BIGTIME = TAKEOFFTIME;
  TMR0 = 0;
  GOTO_ADDRESS(0x03);
  SEND_DATA('<');
  SEND_DATA('>');
  DISPLAY_CLOCK();
  while(1){
    if(ACCEL1){        // has there been a contact?
      TMR0 = 0;        // yes, so start the timers
      BIGTIME = 0;
      while(ACCEL1);   // wait for it to release or timeout
      TIMEROTEMP = TMR0;    // record the time
      TMR0 = 0;            // start the timer again
      if(BIGTIME ==0){     // was there a timeout
```

APPENDIX-continued

```
            if ((TIMER0TEMP>TAKEOFFTIME)){
            // no timeout, was the closure long enough?
            // there was a long takeoff time, assume person has jumped
                BEEP2(); // this takes 40 ms to complete]
                // wait another 100 ms for debounce
                delay_ms(150);
                while(!ACCEL1&&(BIGTIME<10));
                // wait for the next closure
                aTimer = BIGTIME << 8;
                aTimer += TMR0;
                if ((aTimer > 200)&&(aTimer < 930)){
                // has it been at least X time?, but not too long
                    GET_HEIGHT();
                    DISPLAY_CLOCK();// show time
                    BEEP();
                    delay_ms(1000);
                }else{
                    if (aTimer < 200){
                        GOTO_ADDRESS(0x40);
                        SEND_DATA('S');
                    }
                    if (aTimer > 930){
                        GOTO_ADDRESS(0x40);
                        SEND_DATA('L');
                    }
                }
            }
        }
        if(BIGTIME >= 180){
            SHUTDOWN();
        }
        delay_ms(10);
    }
}
void BEEP (void){
    BEEPTIME = 0;
    while(BEEPTIME < 100)
    {
        BEEPTIME++;
        LED2 = 0;
        delay_cycles(300);
        LED2 = 1;
        delay_cycles(900);
    }
}
void BEEP2 (void){
    BEEPTIME = 0;
    while(BEEPTIME < 30)
    {
        BEEPTIME++;
        LED2 = 0;
        delay_cycles(100);      // 300 *4 us = 1.2 ms
        LED2 = 1;
        delay_cycles(100);      // 600 *4 us = 2.4 ms
    }
}
void GET_HEIGHT (void)
{
    unsigned char 1;
    unsigned int temp;
    INCHES = 41;
    for (1 = 0; 1 < 40; 1++){
        temp = (heights[1])*4;
        if (aTimer < temp) {        // look for the height
            INCHES = 1 + 1;         // if you found it, get inches
            1 = 50;                 // break from the loop
        }
    }
}
void DISPLAY_CLOCK (void)
{
    unsigned char data;
    CLEAR_LCD();
    GOTO_ADDRESS(0x03);
    data = INCHES/10;
    SEND_DATA(data + '0');
    data = INCHES%10;
    SEND_DATA(data + '0');
```

APPENDIX-continued

```
}
void SHUTDOWN (void)
{
    TRISB = 0xff;
    TRISA = 0xff;
    GIE = 0;
    INTE = 1; // make sure you'll wakeup
    INTF = 0; // MAKE SURE YOU SLEEP
    #asm
        SLEEP
        nop
        nop
        goto   0
    #endasm;
}
void SETUPS (void)
{
    TRISA = TRISAVALUE;         // setup the port directions
    TRISB = TRISBVALUE;
    OPTION = 0B10000111;        // SET CLOCK TO FOSC 1:256
    INTCON = 0B10100000;        // enable the gloab, t0ie
    LED1 = 1;                   // turn off the leds
    LED2 = 1;
}
void PULSE_ENABLE (void)
{
    ENABLE = 1;
    delay_cycles (1);
    ENABLE = 0;
}
void SEND_COMMAND (unsigned char command)
{
    unsigned char commandlocal;
    commandlocal = command << 4;
    PORTB &= 0x0F;              // clear the upper bits
    PORTB |= commandlocal;
    RS = 0;                     // clear the rs bit for command
    PULSE_ENABLE();
}
void SEND_DATA (unsigned char data)
{
    unsigned char datalocal;
    RS = 1;                     // set the rs for data
    datalocal = data;           // get a local copy of the parameter data
    datalocal &= 0xF0;          // wipe the lower bits
    PORTB = (PORTB&0x0F)|datalocal; // set the upper nibble of the data
    PULSE_ENABLE();             // send the data
    datalocal = data << 4;      // get the lower nibble
    PORTB = PORTB&0x0F|datalocal; // set the upper nibble of the data
    PULSE_ENABLE();             // send the data
    delay_cycles(40);           // let the command complete
}
void INIT_DISPLAY (void)
{
    unsigned char i;
    LCDPWR = 1;
    delay_ms(30);
    for (i = 0;i < 12;i++){
        SEND_COMMAND(inits[i]);
        delay_ms(3);
    }
}
void GOTO_ADDRESS (unsigned char address)
{
    unsigned char localaddress;
    localaddress = address;
    RS = 0;
    localaddress &= 0xF0; // blank the lower bits
    localaddress |= 0x80; // set the 7th bit to make it an address
    PORTB = (PORTB&0x0F)|localaddress;
    PULSE_ENABLE();
    localaddress = address << 4;      // get the lower nibble
    PORTB = (PORTB&0x0F)|(localaddress&0xF0);
    PULSE_ENABLE();
    delay_cycles(40);
}
void CLEAR_LCD (void)
{
    SEND_COMMAND (0);
```

APPENDIX-continued

```
    delay_ms(3);
    SEND_COMMAND(1);
    delay_ms(3);
}
static void interrupt isr(void)
{
    BIGTIME++;
    T0IF = 0;
}
void delay_cycles (unsigned int loops)
{
    int timerloops = 0;
    while(timerloops < loops){
        timerloops += 11;
    }
}
void delay_ms (unsigned int MS)
{
    int msloops = 0;
    while (msloops < MS)
    {
        delay_cycles (130);
        msloops++;
    }
}
```

We claim:

1. An apparatus for measuring a jump, comprising:

an acceleration detector that does not require compression forces thereon;

a controller in communication with said acceleration detector, said controller adapted to receive from said acceleration detector an indication of a start of said jump and an indication of an end of said jump, said controller uses said indication of said start of said jump and said indication of said end of said jump to determine a vertical height of said jump; and an output device in communication with said controller and adapted to report said determined vertical height.

2. An apparatus for measuring a jump, comprising:

an acceleration detector, said acceleration detector comprises a tube and a wire suspended in said tube;

a controller in communication with said acceleration detector, said controller adapted to receive from said acceleration detector an indication of a start of said jump and an indication of an end of said jump, said controller uses said indication of said start of said jump and said indication of said end of said jump to determine a vertical height of said jump; and an output device in communication with said controller and adapted to report said determined vertical height.

3. An apparatus for measuring a jump, comprising:

an acceleration detector, said acceleration detector comprises a brass member and a weight attached to said brass member;

a controller in communication with said acceleration detector, said controller adapted to receive from said acceleration detector an indication of a start of said jump and an indication of an end of said jump, said controller uses said indication of said start of said jump and said indication of said end of said jump to determine a vertical height of said jump; and an output device in communication with said controller and adapted to report said determined vertical height.

4. An apparatus for measuring a jump, comprising:

an acceleration detector, said acceleration detector comprises a brass member, a ball attached at an end of said brass member and an oscillation dampening material attached to said brass member;

a controller in communication with said acceleration detector, said controller adapted to receive from said acceleration detector an indication of a start of said jump and an indication of an end of said jump, said controller uses said indication of said start of said jump and said indication of said end of said jump to determine a vertical height of said jump; and an output device in communication with said controller and adapted to report said determined vertical height.

5. An apparatus for measuring a jump, comprising:

an acceleration detector, said acceleration detector comprises a spring and a weight attached to an end of said spring;

a controller in communication with said acceleration detector, said controller adapted to receive from said acceleration detector an indication of a start of said jump and an indication of an end of said jump, said controller uses said indication of said start of said jump and said indication of said end of said jump to determine a vertical height of said jump; and an output device in communication with said controller and adapted to report said determined vertical height.

6. An apparatus according to claim 1, further including:

a speaker in communication with said controller.

7. An apparatus according to claim 1, further including:

an oscillator in communication with said controller.

8. An apparatus according to claim 1, wherein:

said output device is a display.

9. An apparatus according to claim 1, wherein:

said controller shuts down said apparatus after a preset amount of time without activity.

10. An apparatus according to claim 1, wherein:

said controller wakes up said apparatus after receiving a signal from said acceleration detector after shut down.

11. An apparatus according to claim 1, further including:

a power source connected to said controller and said output device;

a mobile case wearable by a user, said output device is a display, said case houses said acceleration detector, said controller and said display such that said display can be read by a user.

12. An apparatus for measuring a jump, comprising:

means for detecting a start and an end of said jump without an operator providing an input indicating timing for said jump, said means for detecting does not require compression forces thereon;

means for determining a vertical height of said jump based on an output of said means for detecting a start and an end of said jump; and means for reporting said vertical height.

13. An apparatus according to claim 12, further including:

means for housing said means for detecting, said means for determining and said means for displaying that is wearable by a user performing said jump.

14. A method for determining a vertical height of a jump, comprising the steps of:

automatically detecting a start and an end of said jump using an acceleration detector that does not require compression forces;

determining a vertical height of said jump in response to and based on said step of automatically detecting; and reporting said vertical height.

15. A method according to claim 14, wherein said step of automatically detecting further comprises the steps of:
determining a time elapsed during said jump, said step of determining a vertical height of said jump is based on said time elapsed.

16. A method according to claim 15, wherein said step of determining a vertical height includes accessing a look up table based on said time elapsed.

17. A method according to claim 14, wherein:
said acceleration detector includes a switch.

18. A method according to claim 17, further including the step of:
allowing for debounce of said switch after a start of said jump.

19. A method according to claim 17, wherein said step of automatically detecting comprises the steps of:
automatically detecting said start of said jump when said switch opens after being closed; and
automatically detecting said end of said jump when said switch closes after said step of automatically detecting a start of said jump.

20. A method according to claim 17, wherein said step of automatically detecting comprises the steps of:
detecting a first closing of said switch;
detecting an opening of said switch after said first closing of said switch; and
detecting a second closing of said switch.

21. A method according to claim 20, wherein said step of automatically detecting further comprises the step of:
sounding a tone after said step of detecting an opening of said switch.

22. A method according to claim 20, wherein said step of automatically detecting comprises the steps of:
determining an elapsed time between said first closing of said switch and said opening of said switch; and
determining whether said elapsed time is within a predefined time limit.

23. A method according to claim 20, wherein said step of automatically detecting further comprises the steps of:
determining an elapsed time between said opening of said switch and said second closing of said switch; and
determining whether said elapsed time is within a predefined time limit.

24. A method according to claim 20, wherein said step of automatically detecting further comprises the step of:
waiting for debounce after said opening of said switch and before said second closing of said switch.

25. A method according to claim 20, wherein said step of automatically detecting further comprises the steps of:
determining a first elapsed time between said first closing of said switch and said opening of said switch;
determining whether said first elapsed time is within a first predefined time limit;
determining a second elapsed time between said opening of said switch and said second closing of said switch;
determining whether said second elapsed time is within a second predefined time limit;
sounding a tone after said step of detecting an opening of said switch;
sounding a tone after said step of detecting a second closing of said switch;
determining whether a predetermined time period of inactivity period has elapsed; and
shutting down if said predetermined time period of inactivity has elapsed.

26. A method according to claim 17, further including the steps of:
starting operation if said switch is closed after shutting down.

27. A method according to claim 14, further including the steps of:
determining whether a predefined time period of inactivity has elapsed; and
shutting down if said predefined time period of inactivity has elapsed.

28. A method according to claim 27, further including the step of:
starting operation if said switch is closed after shutting down.

29. A method according to claim 14, wherein:
said acceleration detector is an accelerometer.

30. A method according to claim 14, wherein:
said steps of automatically detecting, determining a vertical height and reporting are performed in an apparatus attached to a person performing said jump.

31. A method according to claim 14, wherein:
said step of automatically detecting comprises the steps of:
storing a time indicating said start of a jump, and
storing a time indicating said end of said jump; and
said step of determining a vertical height comprises the steps of:
determining an elapsed time between said time indicating said start of a jump and said time indicating said end of said jump, and
determining a height based on said elapsed time.

32. An apparatus according to claim 1, wherein:
said acceleration detector includes a switch that can be opened and closed; and
said indication of said start of said jump is based on said switch opening after being closed.

33. An apparatus according to claim 32, wherein:
said indication of said end of said jump is based on said switch closing subsequent to said indication of said start of said jump.

34. An apparatus according to claim 12, wherein said means for detecting includes:
a tube; and
a wire suspended in said tube.

35. An apparatus according to claim 12, wherein said means for detecting includes:
a brass member; and
a weight attached to said brass member.

36. An apparatus according to claim 12, wherein said means for detecting includes:
a spring; and
a weight attached to an end of said spring.

37. A method according to claim 14, wherein:
said acceleration detector includes a tube and a wire suspended in said tube.

38. A method according to claim 14, wherein:
said acceleration detector includes a brass member and a weight attached to said brass member.

39. A method according to claim 14, wherein:
said acceleration detector includes a spring and a weight attached to said spring.

* * * * *